United States Patent [19]

Rounds

[11] 4,053,683
[45] Oct. 11, 1977

[54] SYSTEM FOR FUEL SUPPLEMENTATION

[76] Inventor: Charles E. Rounds, 109 S. Case, P.O. Box No. 6, Marion, Mich. 49665

[21] Appl. No.: 663,671

[22] Filed: Mar. 4, 1976

[51] Int. Cl.² .......................... H01M 2/12; F02M 7/00
[52] U.S. Cl. .......................................... 429/8; 429/71; 429/67; 429/83; 123/119 E
[58] Field of Search ...................... 123/119 E, 122 H; 429/8, 50, 67, 71, 72, 73, 81, 83

[56] References Cited

U.S. PATENT DOCUMENTS

| | | | |
|---|---|---|---|
| 1,058,916 | 4/1913 | Spear et al. | 429/83 |
| 1,236,673 | 8/1917 | Chamberlain | 429/71 |
| 1,302,648 | 5/1919 | Flanders | 429/71 |
| 1,416,214 | 5/1922 | King | 429/71 |
| 3,311,097 | 3/1967 | Mittelslaedt | 123/119 E |
| 3,648,668 | 3/1972 | Pacheco | 123/119 E |
| 3,913,544 | 10/1975 | Fyie | 123/122 H |
| 3,982,517 | 9/1976 | Fales et al. | 123/122 H |

Primary Examiner—Donald L. Walton
Attorney, Agent, or Firm—Price, Heneveld, Huizenga & Cooper

[57] ABSTRACT

An improved wet plate battery for use in the electrical system of an internal combustion engine and adapted to produce hydrogen and oxygen gases for enrichment of the air/fuel mixture is disclosed. The battery includes a plurality of electrical generating cells having positive and negative plates immersed in an electrolyte. Air tubes extend through the battery case and provide communication between the space below the plates with the atmosphere. A gas discharge port is provided in the top of the case above the electrical generating cells and is connected through suitable tubing to a source of vacuum in the induction system of the engine.

3 Claims, 8 Drawing Figures

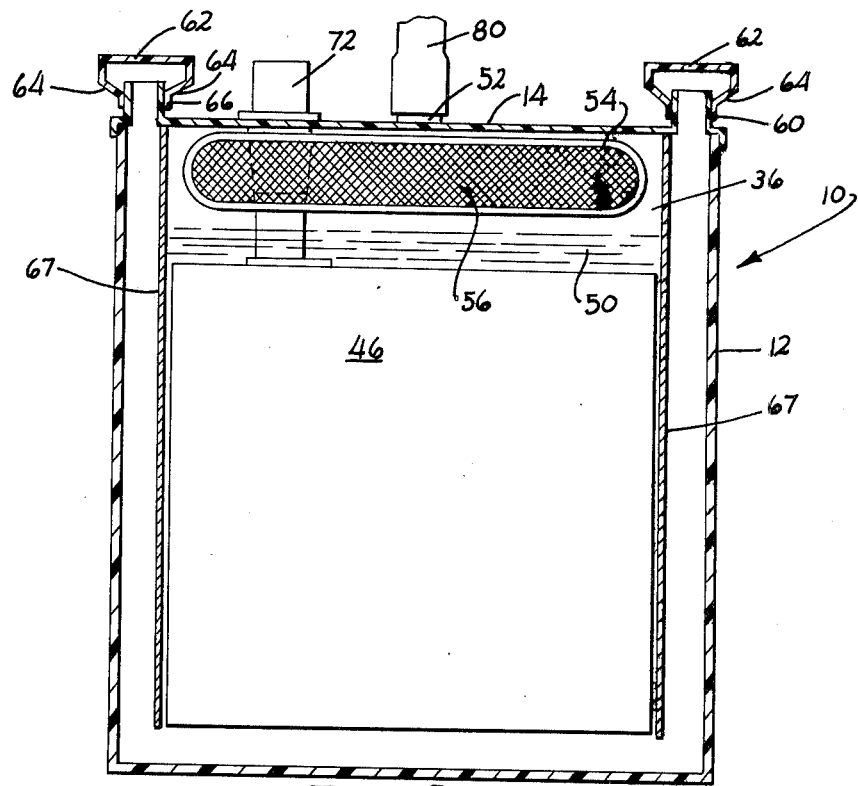
FIG. 3.
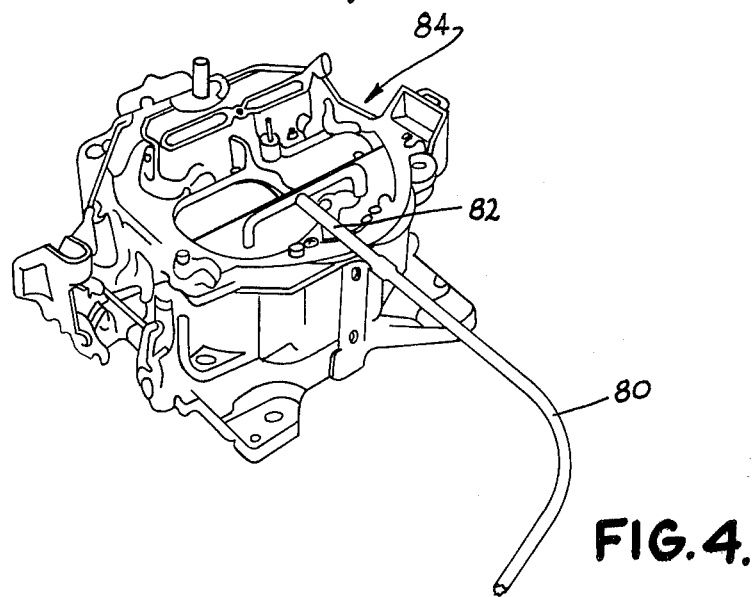
FIG. 4.
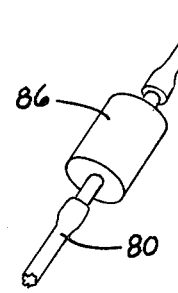

SYSTEM FOR FUEL SUPPLEMENTATION

BACKGROUND OF THE INVENTION

This invention relates to enrichment of the air/fuel mixture of an internal combustion engine and more particularly to enrichment with oxygen and hydrogen gases produced in a wet plate storage battery which forms a part of the electrical system of the internal combustion engine.

Typically, the electrical systems employed with an internal combustion engine, for example of the type employed in automobiles, includes a generator or alternator, a voltage regulator, a rechargeable or storage battery of the lead-acid type, an ignition switch, an ignition coil, a distributor, and a plurality of spark plugs. During engine operation, electricity generated by the generator or alternator is directed to the rechargeable battery to maintain the battery charge so as to meet the variable loads imposed on the battery during use.

The typical lead/acid storage battery includes a plurality of cells connected in series with each cell producing approximately 2 volts. Each electrical generating cell includes a negative plate group and a positive plate group. Each plate is formed by a lattice-like grid of an alloy of lead and antimony and the grids are filled with a special lead-oxide paste. The amount of current produced by the storage battery is determined by the active area and weight of the materials in the plates and also by the quantity of electrolyte which is typically a dilute sulfuric acid solution. The positive plate material is essentially lead peroxide and the active material of the negative plate is spongy lead. The electrolyte is a solution of sulfuric acid and water. When an electrical load is placed across the positive and negative terminals of the battery, oxygen in the lead peroxide combines with the hydrogen from the sulfuric acid to form water. At the same time, the lead in the lead peroxide combines with the sulfate of the acid to form lead sulfate. At the negative plate, the lead combines with the sulfate of the sulfuric acid to form lead sulfate. The battery is recharged by directing a charging current through the battery in the reverse direction of the discharging current. During charge, the water in the electrolyte is broken down into hydrogen and oxygen through electrolysis. The oxygen collects at the positive plate and the hydrogen collects at the negative plate. The collection of the gas layer at each plate increases the internal resistance of the cell and therefore an increase in charging voltage is necessary to maintain the same charging current flow.

Heretofore, it has been proposed to employ the hydrogen and oxygen produced during battery recharge to supplement and/or enrich the air/fuel mixture employed in the internal combustion engine. An example of one such system may be found in U.S. Pat. No. 1,876,879 to Drabold, entitled CHARGE FORMING APPARATUS FOR INTERNAL COMBUSTION ENGINES, and issued on September 13, 1932. As shown therein, hydrogen produced in the main storage battery of the vehicle ignition and electrical system is collected by a plurality of tubes opening into the space above the electrolyte. The gases are directed via a vacuum line to the throat of a conventional venturi-type carburetor. The Drabold arrangement collects only the gas which is present above the electrolyte during charging of the main storage battery.

A similar system is disclosed in U.S. Pat. No. 3,311,097 to Mittelstaedt, entitled HYDROGEN-OXYGEN DEVICE IN COMBUSTION ENGINES, and issued on Mar. 28, 1967. The storage battery disclosed therein for producing oxygen and hydrogen gases for air/fuel mixture enrichment is provided with an air intake opening. When a vacuum is applied to the space above the cells of the battery, ambient air is drawn in through the intake opening and across the space above the cells. This feature apparently increases the amount of gases which pass to the venturi of a conventional carburetor. Further, it appears that this flow of ambient air assists in cooling the battery during engine operation.

With all of the systems of the type exemplified by the above discussed patents, certain problems are present. For example, during the recharging process in the normal storage battery polarization increases the resistance of the battery and therefore requires an increase in the charging voltage to maintain the charging current flow. Further, during the discharge process, water is formed adjacent the positive plates. In cold weather, this results in an increased tendency for freezing at the positive plates. The need therefore exists, for a hydrogen-oxygen generator capable for use as a primary storage battery in a vehicle electrical system which produces a fairly large amount of gases for enrichment without an increase in internal resistance caused by polarization and further maintains sufficient mixing of the electrolyte to prevent freezing adjacent the positive plates in cold weather.

SUMMARY OF THE INVENTION

In accordance with the present invention an improved wet plate battery is provided as well as a method for enriching the air/fuel mixture of an internal combustion engine whereby the problems heretofore experienced are substantially alleviated. Essentially, the wet plate battery in accordance with the present invention includes an electrical generating cell disposed within a case. The cell includes positive and negative plates which are immersed within an electrolyte. An air tube is provided which extends through the case and has one end open to atmosphere exteriorly of the case. The other end of the air tube opens adjacent the bottom of the cell and is immersed in the electrolyte. A gas discharge port is formed in the top surface of the case. This port is adapted to be connected to a source of vacuum in the engine induction system.

As a result of this arrangement, as the vacuum is applied to the gas collection space above the cell, ambient air is drawn downwardly through the air tube and bubbles upwardly through the electrolyte. The air then passes with the liberated oxygen and hydrogen through the gas discharge port to the induction system of the engine. By drawing air through the electrolyte of the battery, the electrolyte is sufficiently agitated to prevent the formation of a gas layer on the plates. The arrangement maintains the electrolyte in a sufficiently mixed or agitated state to prevent freezing adjacent the positive plates. Further, the air flow passing up through the electrolyte increases the amount of gases liberated through the surface of the electrolyte and also assists in scavenging the oxygen and hydrogen from the gas collection space to the gas discharge port.

BRIEF DESCRIPTION OF THE DRAWINGS

FIG. 3 is a cross-sectional, elevational view taken along line III—III of FIG. 1;

FIG. 4 is a view illustrating the manner in which the battery of FIGS. 1–3 may be connected to the induction system of an internal combustion engine;

DETAILED DESCRIPTION OF THE PREFERRED EMBODIMENT

Figure 1:
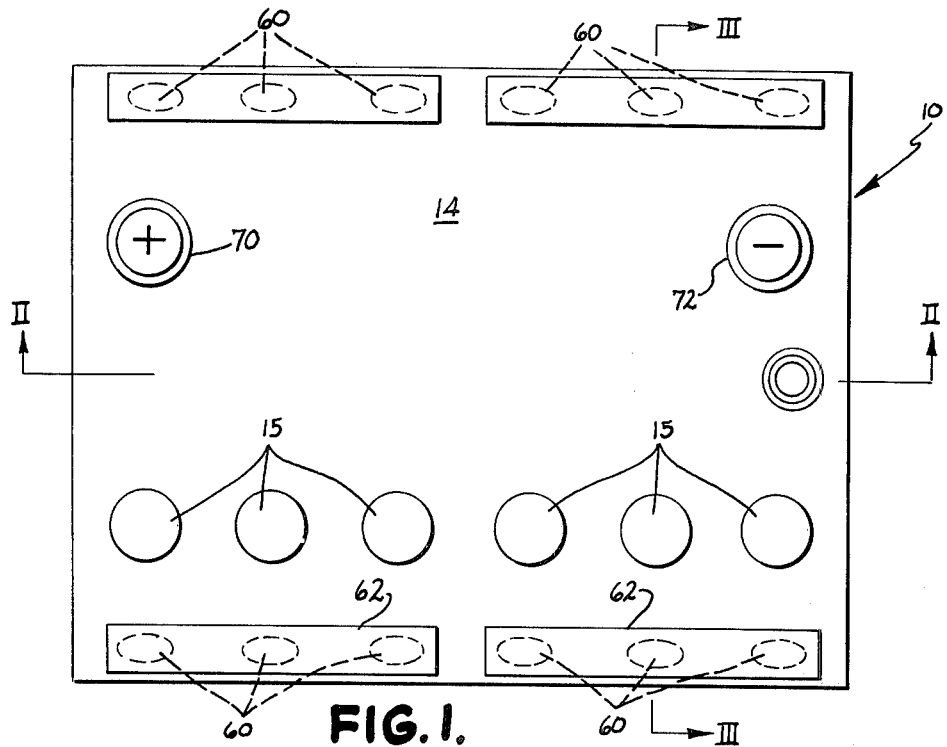
FIG. 1 is a plan view of a wet plate battery in accordance with the present invention.
Figure 2:
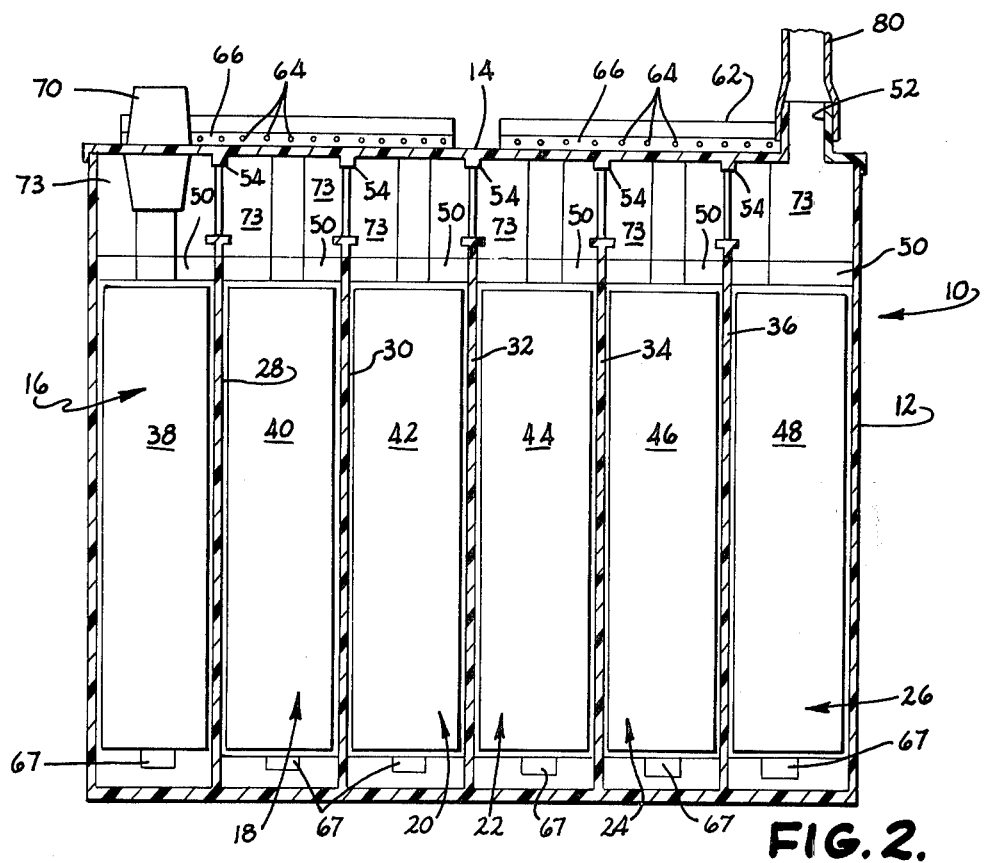
FIG. 2 is a cross-sectional, side elevational view taken along line II—II of FIG. 1.

One embodiment of an improved wet plate storage battery in accordance with the present invention is illustrated in FIGS. 1–3 and generally designated 10. As shown, the battery 10 includes a case 12 formed of a rubber-type or hard plastic material which is resistant to corrosion. The molded case 12 includes a top 14. The top 14 is illustrated as a separate member and includes a plurality of non-vented fill caps 15. As best seen in FIG. 2, the case 12 is divided into a plurality of electrical generating cells 16, 18, 20, 22, 24 and 26, all of which are connected in series. In the typical lead-acid storage battery, each electrical generating cell is capable of producing a two volt output. Therefore, the battery shown in the drawings as having six cells is a 12 volt type battery.

Each of the electrical generating cells is defined by the side and bottom walls of the case 12 and by a plurality of cell dividing walls 28, 30, 32, 34 and 36 which are formed as part of the case during the case molding operation. Each electrical generating cell includes a conventional positive and negative plate group 38, 40, 42, 44, 46 and 48 respectively, illustrated schematically in FIGS. 2 and 3. In the typical lead-acid storage battery, the positive plates are formed from a composition including lead peroxide, and the negative plates are formed from a composition including spongy lead. The case 12 is filled to a point just below the tops of the dividing walls with a liquid electrolyte 50 such as a water-sulfuric acid solution. As shown, the lower end of each of the plate groups terminates above the bottom wall of the case. This space is primarily provided to reduce the chance of grounding out of the positive plates by the precipitates which collect at the bottom of the case.

As best seen in FIGS. 2 and 3, each dividing wall 28, 30, 32, 34 and 36 is formed with an elongated aperture 54. Positioned within each aperture 54 is a fine mesh-type filter screen 56. The walls in conjunction with the battery case define a plurality of gas collection chambers. A gas discharge tube 52 is formed in the cover 14 and is in communication with the gas collection chambers. As will be more fully described below, the mesh screens allow air and other gases collected in the gas collection chambers to pass unrestricted to the gas discharge port and tube while restraining or eliminating the passage of the liquid electrolyte.

As best seen in FIGS. 1–3, the upper wall or top cover 14 of the battery case includes a plurality of inlet ports or passages 60. The inlet ports 60 are longitudinally spaced and extend along each lateral edge of the cover 14. Therefore, each generating cell includes two air intake ports. The ports 60 may be formed in a row with the cover 14 during the molding operation or they may take the form of separate, tubular inserts press fit and secured by suitable adhesives within apertures formed in the cover. As seen in FIGS. 1 and 2, the air inlet ports 60 are divided into groups of three. Each group of three includes a common intake shroud 62. The intake shroud is press fit over the intake ports and includes a plurality of air inlet apertures 64 formed in a lower side wall 66. The intake shroud 62 serves to permit ingress of ambient air while effectively preventing the ingress of undesired contaminants and/or liquids. A filter-like material may be disposed within the shroud 62 to more effectively prevent the ingress of dust and other particulate contaminants.

As best seen in FIGS. 2 and 3, the lower open end of each air inlet port 60 is in communication with the downwardly extending air passage tube 67. Each air passage tube 67 is effectively sealed at its upper end by the cover 14. Each tube 67 may be formed as part of the case during the molding operation or the tubes may be separate inserts positioned in the battery case after forming. For reasons which will become readily apparent, each air passage tube 67 extends from an air inlet port 60 to a point below each cell plate group.

As in conventional battery ignition systems, the positive terminal 70 and the negative terminal 72 are in electrical connection with the alternator or generator of the charging system. As a result, during battery charge, oxygen gas will be formed adjacent the positive plate groups and hydrogen gas will be formed adjacent the negative plate groups of each generating cell. These gases will collect above the electrolyte in the gas collection spaces 73.

An exhaust tube 80 is sealably connected at one end to the exhaust port 52. As best seen in FIG. 4, the exhaust tube 80 extends from the exhaust port 52 to a gas induction orifice tube 82. The orifice tube 82 is supported on a conventional carburetor 84 adjacent the throat area of the carburetor air horn. The carburetor is shown for illustrative purposes only as being of the multi-valve or multi-barrel type. An orifice tube having a single outlet, of course, may be employed. Further, it is preferred that a conventional back pressure-type check valve 86 be inserted at some point in exhaust tube 80. The back pressure check valve 86 is inserted in the exhaust line 80 in order to insure that gases flow only to the carburetor and to prevent flow of gases from the carburetor back to the battery.

Having fully described the structural arrangement of the improved wet plate battery, the method of operation will now be more fully described. As is apparent, during engine operation a low pressure are will be created at the gas induction orifices. This will impress a vacuum or reduced pressure area over each generating cell at the gas collection chamber. As a result of this vacuum, ambient air will be drawn in through the inlet ports 60 and downwardly through the air admission tubes 67. The air will exit from the tubes below the plate groups of each generating cell and will therefore bubble upwardly through the electrolyte. During engine operation, the gases formed will be forced upwardly by the air bubbling through the electrolyte. The agitation of the electrolyte will assist in preventing polarization by insuring that the gas layer formed at either of the plate groups is removed. The agitation insures constant mixing of the electrolyte resulting in optimum battery performance and preventing freezing adjacent the positive plate during cold weather operation. Further, the agitation assists in reducing the surface tension at the interface between the electrolyte and the gas in the gas collection chambers. This feature insures that more of the oxygen and hydrogen generated during the charging process will escape from the electrolyte and be drawn through the exhaust port 52. If desired, a glass wool-like material may be placed at the electrolyte surface to further reduce the surface tension. The mesh filters 56 insure that the gases are effectively removed from the gas collection chambers substantially free of the liquid electrolyte. Also, by passing the ambient air downwardly and then upwardly through the electrolyte, there is an improvement in battery cooling over that heretofore found in the prior art batteries. The vacuum available from the carburetor should be sufficient to draw ambient air through the battery. If a sufficient vacuum is not available at this source, a small, conventional vacuum pump could be inserted in tube 80. This pump would then provide the required boost in vacuum level.

By enriching the air/fuel mixture ingested by the internal combustion engine, various advantages are realized. For example, the efficiency of the engine is increased. This is believed to be the result of more complete combustion resulting from induction of the hydrogen gas. As a result, the internal combustion engine should operate with increased power, better fuel economy, as well as with a reduction in carbon buildup in the combustion chamber. Since the battery is effectively sealed and all gases produced are discharged to the engine induction system, corrosion at the battery terminals is reduced. Also, the danger of explosion at the battery during engine operation is eliminated. This latter danger is always present in batteries which have vented filler caps permitting the explosive gases to collect adjacent the top of the battery in the engine compartment.

Figure 5:
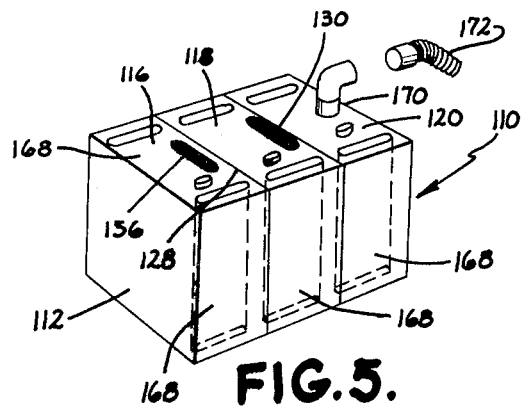
FIG. 5 is a perspective view of an alternative form of battery in accordance with the present invention.

An alternative construction for the wet plate battery is illustrated in FIG. 5. As shown therein, the battery 110 includes a molded case 112. The case 112 is divided into cells 116, 118 and 120 by walls 128 and 130. As in the previous embodiment, the cell dividing walls 128, 130 each include an elongate aperture 154. A fine mesh-type filter screen 156 is positioned within each aperture. In this embodiment, a pair of spaced air passage tubes 168 extend from the cover 114 of the case downwardly below the electrolyte within each cell. The tubes 168 are generally oval or flattened in cross section having a transverse dimension almost equal to the width of each cell. As a result, the tubes 168 provide an increased flow area when compared with the tubes 16 of FIG. 3.

Figure 6:
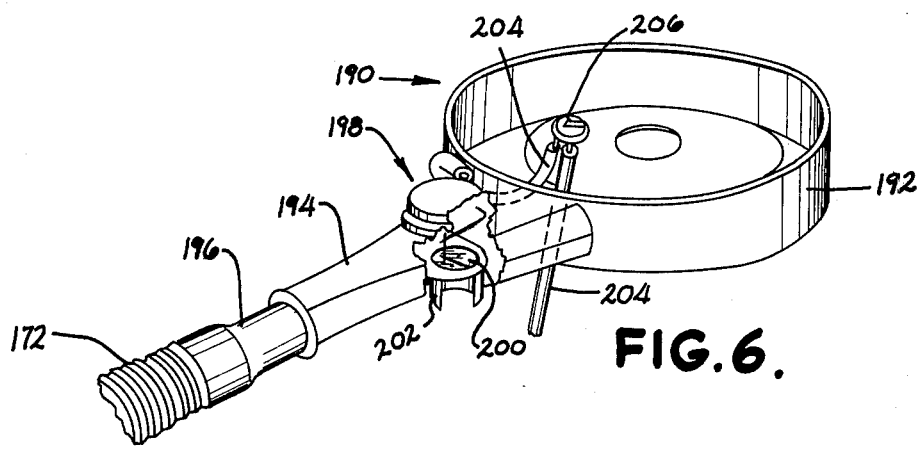
FIG. 6 is a perspective, fragmentary view showing an alternative connection to the air cleaner system of an engine.

As with the previous embodiment, an exhaust port 170 is connected to an exhaust tube 172. Exhaust tube 172, however, is connected to an air cleaner assembly 190 shown in FIGS. 6 and 7. With this arrangement, the larger air passage tubes 168 are required since substantially the entire air requirement for the engine may be drawn through the electrolyte within the battery. The air cleaner assembly 190 is of a conventional construction including a filter receiving housing 192 and an air intake snorkel 194. A transition tube 196 inserted into the opening of the snorkel 194 permits a sealed connection of exhaust tube 172 to the snorkel.

The conventional air cleaner includes a vacuum actuated damper unit 198 having a butterfly-type valve 200 rotatably mounted within the snorkel adjacent a heated air delivery tube 202. Air is supplied to tube 202 from a stove arrangement (not shown) mounted adjacent the exhaust manifold. A vacuum line 204 connects the unit 198 with a source of vacuum through a temperature sensitive vacuum bleed valve 206.

Figure 7:
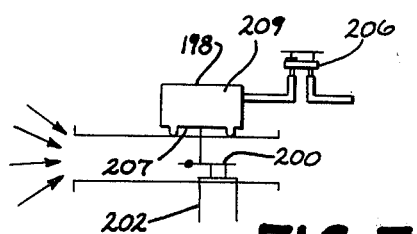
FIG. 7 is a fragmentary, side elevational view in cross section of the air cleaner system of FIG. 6.

During cold operating conditions, the valve element 200, which is connected to a diaphragm 207, closes off the snorkel inlet and heated air is drawn up tube 202 and into the filter housing 192 (FIG. 7). As the operating temperature of the engine increases, the sensing unit and bleed valve 206 will open and progressively bleed off the vacuum applied to the diaphragm 207 within the unit 198. A spring 209 within the unit will then rotate valve 200, thereby closing off inlet tube 202 and permitting air to enter the carburetor from battery exhaust tube 172. Since the position of the damper valve 200 is a function of intake manifold pressure and engine temperature, the amount of outside air mixed with the air and gases drawn from the battery will vary as a function of intake manifold pressure, engine speed and temperature. With this embodiment, due to the increased flow rates through the battery, glass wool should be placed at the electrolyte surface in the gas collection space to reduce electrolyte surface tension.

Figure 8:
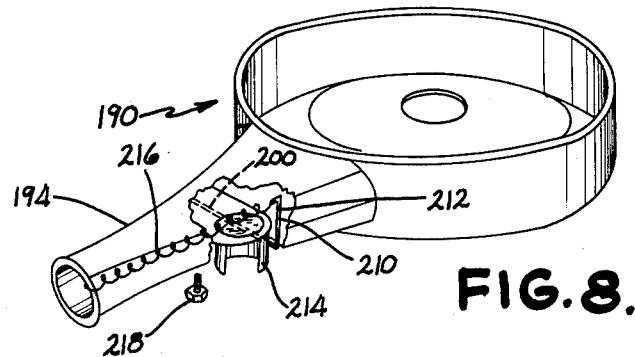
FIG. 8 is a perspective, fragmentary view of an alternative air cleaner system.

A manually adjustable damper assembly is illustrated in FIG. 8. This arrangement is usable with older vehicles not having the automatic air mix system of FIG. 6. As shown, a damper valve 200 is rotatably mounted on a shaft 210 having a right angled portion 212. The valve is positioned over an outside air inlet 214. A spring or other resilient means 216 hooked to the snorkel and the portion 212 biases the valve to a closed position wherein the total air requirements are filled from the ambient source. An air adjustment member 218 is received within a threaded aperture in the snorkel. The screw 218 contacts a transverse area of the valve element. By screwing the member 218 into the snorkel, the valve 200 is pivoted against the bias of the spring 216, thereby partially or wholly closing the ambient air tube or inlet 194 and permitting the induction of air and gas from the battery.

By providing a sufficiently long and flexible exhaust tube 172, the induction pulsations may be effectively dampened. Thus, a fairly even vacuum may be applied at the gas collection chamber of the battery.

Although the present arrangement has been described with the improved wet plate battery serving as the storage battery of a vehicle ignition and electrical system, it, of course, would be possible to provide a separate battery to satisfy the electrical requirements of the vehicle. In such case, the improved lead-acid type wet plate battery of the present invention would be separately connected to the vehicle generating system or to a separate generator. It is believed that if a sufficient number of hydrogen fuel generators or batteries in accordance with the present invention were provided, the internal combustion engine could be operated solely on hydrogen gas thereby eliminating the need for gasoline.

It can therefore be appreciated that the present invention provides an improved wet plate battery for the production of hydrogen gas for fuel enrichment as well as an improved method for enriching the air fuel mixture of a conventional internal combustion engine. It is expressly intended that the foregoing description be illustrative of the preferred embodiments only. The true spirit and scope of the present invention will be determined by reference to the appended claims.

The embodiments of the invention in which an exclusive property or privilege is claimed are defined as follows.

1. An improved wet plate battery for use with an internal combustion engine carburetor and adapted to produce oxygen and hydrogen gas for enriching the air/fuel mixture inducted into the internal combustion engine, comprising:
    a case;
    a plurality of electrical generating cells separated by a plurality of separating walls within said case, each having positive and negative plates, said plates being immersed in a dilute electrolyte;
    a plurality of air tubes extending into said cells, each tube extending into one cell and said air tubes each having one end open to atmosphere exteriorly of said case and having the other end open below said electrolyte level in said cell, below said plates and being immersed in said electrolyte;
    a gas discharge port disposed on the top of said case above the electrolyte and adapted to be connected to a source of vacuum at the carburetor, each of said cell separating walls having an aperture above the electrolyte;
    means disposed within said separating wall apertures for permitting the gases collecting above said plates to pass to said gas discharge port while restraining passage of the electrolyte;
    a plurality of intake shrouds positioned above said air tubes, said shrouds having a plurality of apertures communicating a plurality of said tubes with atmosphere;
    a gas discharge tube sealably connected at one end to said gas discharge port, said gas discharge tube adapted for connection to the carburetor of the engine; and
    a check valve inserted intermediate the ends of said discharge tube.

2. In combination with an air cleaner assembly of an internal combustion engine, an improved wet plate battery comprising:
    a molded case;
    a plurality of electrical generating cells within said case, each cell including positive and negative plates;
    a plurality of wall members separating each cell within said case, each wall member having an aperture thereby placing the area above each cell in communication with the adjacent cell;
    a plurality of air tubes extending from the top of said case downwardly within each of said cells, said air tubes being open at their ends with the lower end terminating adjacent the bottom of said case;
    a gas discharge port formed in the top of said case;
    means disposed within said cell wall apertures for permitting the gases collecting above said plates to pass to said gas discharge port while restraining passage of electrolyte;
    a gas exhaust tube connected at one end to said port and at the other end to said air cleaner assembly, said air cleaner assembly including an outwardly extending air intake snorkel, said other end of said tube being connected to the inlet of said snorkel whereby at least a portion of the air requirements of the engine are supplied by air drawn downwardly through said air tubes and through said battery, said snorkel having an aperture therein downstream of the snorkel inlet communicating the interior of said snorkel with ambient air; and a damper valve means disposed within said snorkel and having a valve element for partially or wholly closing said ambient air aperture and for varying the ratio of ambient air to gases from said battery supplied to said engine as a function of intake manifold pressure and engine temperature.

3. The combination defined by claim 2 wherein said valve means includes:
    a damper valve element rotatably mounted within said snorkel;
    resilient means connected to said valve element for biasing said valve to a position wherein substantially all the air requirements are supplied from the ambient air; and
    adjustable valve position means mounted to said snorkel and engaging said valve element for selectively varying the position of said valve element as a function of intake manifold pressure and engine temperature thereby varying the ratio of ambient air to gases from said battery supplied to said engine.

* * * * *